US006085500A

United States Patent [19]

Keppick

[11] Patent Number: 6,085,500

[45] Date of Patent: Jul. 11, 2000

[54] EQUESTRIAN TRAINING DEVICE

[76] Inventor: Kim Keppick, P.O. Box 1268, Middleburg, Va. 20118

[21] Appl. No.: 09/150,372

[22] Filed: Sep. 10, 1998

[51] Int. Cl.[7] ............................... B68B 1/00; B68B 1/04; A01K 27/00

[52] U.S. Cl. ....................... 54/71; 54/34; 54/16; 119/798

[58] Field of Search ............................. 54/6.1, 7, 16, 24, 54/34, 36, 71; 119/798; 24/300, 301

[56] References Cited

U.S. PATENT DOCUMENTS

| | | | |
|---|---|---|---|
| 68,569 | 9/1867 | Miller | 54/34 |
| 122,491 | 1/1872 | Robbins | 54/16 |
| 136,256 | 2/1873 | Nealey et al. | 54/16 |
| 312,330 | 2/1885 | Champlain et al. | 54/16 |
| 424,258 | 3/1890 | Belknap | 54/6.1 |
| 565,681 | 8/1896 | Hutton | 54/16 |
| 749,929 | 1/1904 | Fuller | 54/16 |
| 2,737,154 | 3/1956 | Michonski | 119/798 |
| 4,965,987 | 10/1990 | Bork | 54/7 |
| 4,993,366 | 2/1991 | Sager | 119/798 |
| 5,094,062 | 3/1992 | Clark | 54/71 |
| 5,146,876 | 9/1992 | McPhail | 119/798 |
| 5,442,900 | 8/1995 | Ciampi | 54/71 |
| 5,749,326 | 5/1998 | Jones et al. | 119/798 |
| 5,873,328 | 2/1999 | Campbell | 119/798 |
| 5,915,336 | 6/1999 | Watson | 119/798 |

FOREIGN PATENT DOCUMENTS

| | | | |
|---|---|---|---|
| 9691 | 10/1853 | France | 54/71 |
| 2615846 | 12/1988 | France | 54/16 |
| 6036 | 10/1894 | Sweden | 54/34 |
| 19772 | of 1894 | United Kingdom | 54/34 |
| 15521 | 8/1916 | United Kingdom | 119/798 |
| 117116 | 7/1918 | United Kingdom | 119/798 |
| 426081 | 3/1935 | United Kingdom | 119/798 |
| 2264219 | 8/1993 | United Kingdom | 119/798 |

*Primary Examiner*—Michael J. Carone
*Assistant Examiner*—Fredrick T. French, III
*Attorney, Agent, or Firm*—Jones, Tullar & Cooper, P.C.

[57] ABSTRACT

An equestrian rider training device incorporated into the reins of a bridle. The training device has an elastic portion in each rein between the bit and the rider's end of the reins. The elastic portion of the device trains the new rider in applying the proper pressure on the reins in order to closely control the mount while not applying excessive pressure which may irritate or injure the mount and make delicate control more difficult. The elastic portion is backed by an inelastic portion which is of greater length than the unextended elastic portion so that if greater pressure is required to control the mount, such as a runaway mount, the rider may apply direct pressure to the bit for emergency control.

7 Claims, 3 Drawing Sheets

EQUESTRIAN TRAINING DEVICE

BACKGROUND OF THE INVENTION

This invention relates in general to devices for training an equestrian and in particular for training an equestrian in attaining the skills necessary to control the movements of the mount in all respects with the least effort for the rider and the least discomfort to the mount while retaining sufficient control to handle emergency conditions. These skills are necessary in order for riders to achieve basic proficiency in their riding so that they are confident that they can easily maintain their balance and posture while precisely controlling the speed and direction of their mount. Riders not only want to get from A to B but want to carefully control and influence the manner in which they get there. In the journey from A to B the rider strives to enhance the beauty of the mount by improving his balance, suppleness and understanding of the rider's signals. The mount must understand not only the direction to turn, for example, but must also understand how much the rider wants him to bend his body and stretch his back; how high to lift his legs and precisely where to put them down during the course of the turn.

To achieve this result requires close communication between the mount and rider through the use of the rider's legs and torso, (the seat) and more importantly, the contact between the rider's hands and the mouth of the mount. If this contact is too loose, the connection between mount and rider is ineffective and fine control is lost. However, if the connection is too tight, that is, the reining control force is too high, the force of the bit can injure the mount's mouth, which is of very sensitive tissue, and the discomfort caused to the mount can interfere with a smooth and beautiful performance by the mount and rider. An irritated mount can understandably become "uncooperative" and detrimentally effect the performance.

Beginning riders tend to apply rein tensions higher than necessary and tend to apply reining force in a jerky manner thus effecting the mount's response and cooperation. In order to apply just the right rein tension requires the development of a "feel" in the hands of the rider so that the rider can communicate his desired instructions to the mount and maintain a good relationship with the mount.

SUMMARY OF THE INVENTION

The present invention overcomes the disadvantages discussed above by providing a training system which will allow a rider to develop the ability to apply and maintain the proper tension in the reins without becoming rigid in his posture and will allow him to concentrate on learning to use the shoulders and elbows to create the "feel" for a proper riding style.

This invention provides a device to be inserted at the end of the bit in each of the ends of the reins which contains an elastic portion which allows the rider to attain proper techniques without injuring the mount while learning to sense the communicative touch necessary to join the mount and rider into a team of performers who understand each other and communicate their understandings easily and consistently. While the device of this invention provides a soft rein for the rider, one embodiment allows a stronger control force when required such as in the case of a run-away mount.

DETAILED DESCRIPTION OF THE PREFERRED EMBODIMENT

Figure 1:
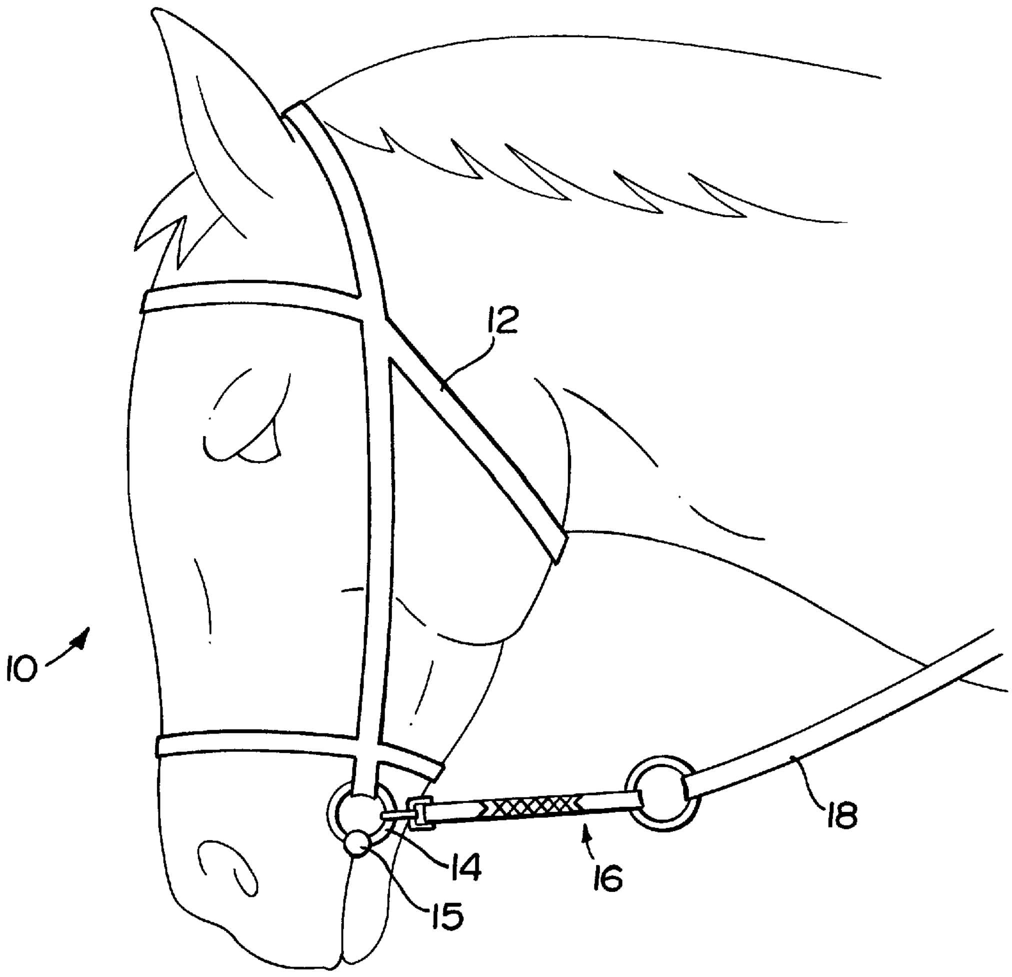
FIG. 1 is a side view of a horse wearing a bridle with the training device corporated in the reins of the bridle.

Referring now to FIG. 1, there is shown the head of a horse 10 wearing a bridle 12 of known design and having the invention of this application incorporated in the reins of the bridle and shown generally at 16. The bridle includes a bit 15 attached to the bridle through a ring 14. This is an illustration of a simple form of bridle. However, it is understood that the invention of this application may be used in the same manner with bridles and bits of other varied configurations.

Figure 2:
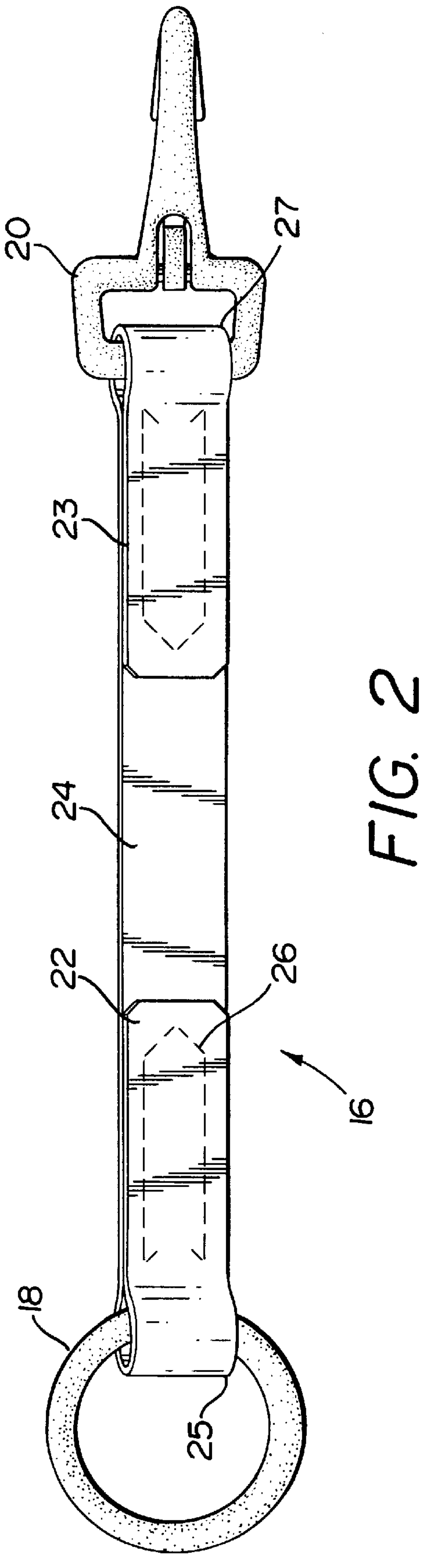
FIG. 2 illustrates a first embodiment of the invention.

FIG. 2 illustrates one embodiment of the invention. The training device consists of a strap assembly 16 to be incorporated into the reins 18 of a bridle. The strap consists of end members 22 and 23 which are made of a substantially inelastic material. This portion of the strap would traditionally be made of leather of approximately ⅝ inch width. Connecting the two inelastic ends of the strap is an elastic portion 24. This portion of the strap, which is the approximately same width as the leather ends, may be made of any elastic material having appropriate stretch or elongation properties. The end members 22 and 23 are formed into loops 25 and 27 respectively. Loop 25 encloses a portion of ring 18 which provides a means of attachment to the rein of the bridle. Loop 27, in this embodiment, secures a snap 20 for attaching the strap to the bit. Details of these properties of the elastic material will be discussed in more detail below.

Figure 3A:
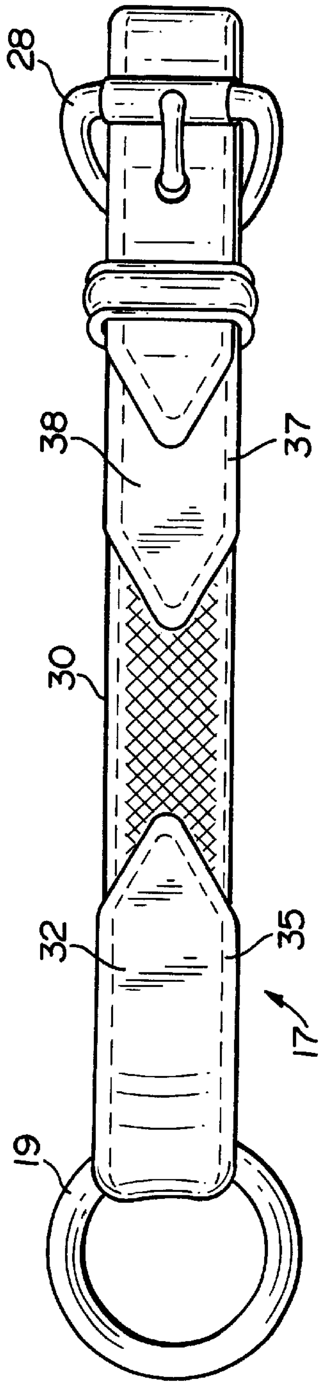
FIG. 3 illustrates a second embodiment of the invention.
Figure 3B:
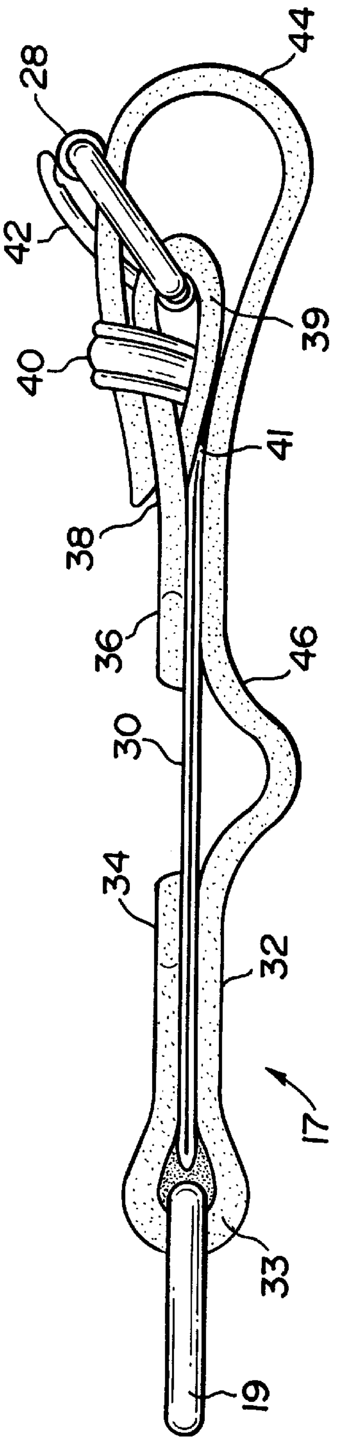

Referring now to FIGS. 3A and 3B, there is illustrated another embodiment of the invention. The strap assembly 17 is similar to the strap 16 of FIG. 2, having a ring 19 for attachment of the strap to the rein 18 of the bridle 12. Here again the strap is formed of two inelastic members and an elastic member in a manner which allows the strap to elongate within preset limits. In this embodiment, the end piece 32 is formed in a loop 33 around the ring 19. An elastic member 30 is inserted between the layers of the piece 32 which form the loop 33. The piece 32 and the elastic member 30 are fastened together at 34 to form a three layer end assembly. The fastening means may be of any known type. Traditionally, the end piece 32 and the elastic member 30 would be sewn together as shown at 35. A second end piece 38 is formed in a loop 39 around a buckle 28 and also fastened to the elastic member 30. Here, the end piece 32 and the end piece 38 are attached on opposite ends of the elastic member 30 to form a second three layer end assembly. The tail end 41 of the end piece 38 is tucked between the end piece 32 and the outer portion of the end piece 38 and is attached to both end pieces. The means for attaching the end piece to the elastic member 30 could again be of any known type of fastening means. However in the illustrated embodiment the layers of the end assembly are shown sewn together by stitching 37 which gives the assembly a look traditionally associated with equestrian tack.

The end piece 32 then is formed into a loop 44 for attachment to the bit 15 of the bridle 12. This loop is secured by passing the loop end 44 of the end piece 32 through the buckle 28 and inserting the tang 42 of the buckle 28 into a hole provided in the end piece 32 in the usual manner. The tail end of the end piece 32 is then retained by a loop 40.

The feature of this embodiment is the loop 46 formed in the end piece 32 opposite the elastic member 30. This loop allows the elastic member 30 to stretch until the loop 46 has been straightened. At this point, the strap assembly acts as a solid strap connecting the rein to the bit. In this condition, the rider can exert as much force on the rein as may be needed to control the horse in case of an emergency condition.

The selection of the appropriate elastic material for use in this invention is critical. The fabric can be woven, braided or knitted. The material to be used in this invention must be selected according to the percent of "stretch" the material provides as well as its appearence and weight. The "stretch" is expressed as the percent of the unstretched length of the elastic member by which the member may be lengthened when the member is at its maximum stretched length. For example, a 10 inch elastic member which can be stretched one inch will have a stretch of 10 percent. A wide range of materials has been tested ranging from 20 percent stretch to 120 percent stretch. These tests showed that a stretch of between 50 percent and 70 percent appears to provide the most beneficial feel with the horses tested. It would be appropriate to have several of these strap assemblies available, each having an elastic member of different amounts of stretch in order to provide the best feel depending on the horse-rider combination being trained. That is, the stretch provided for one rider may not be appropriate for another rider having a different style or a different level of riding experience. In general, the width of the strap is ⅝ inch which is the same width as a standard rein. It is desirable to have the strap assembly a short as practical to keep the rein light and of a convenient length.

As can be seen from the above description, there is provided by this invention a valuable piece of equipment, tailored to a particular horse and/or rider combination, which will enable the rider to develop an appropriate "feel" for the proper tension to apply to the rein which will give the best control of the horse while keeping the horse in a cooperative mood without causing injury to the horses mouth yet allow the rider to retain total control in the event of an emergency such as a runaway horse.

What is claimed is:

1. An equestrian rider training system comprising a pair of devices connected to the first and second ends of the reins of a bridle said bridle including a bit for insertion in the mouth of the mount to be ridden, said bit having first and second ends extending from each side of the mount's mouth said system comprising:

a first device comprising:

a first strap member having first and second ends;

a second strap member having first and second ends;

an elastic member extending between said strap members;

first and second connecting means attached to respective first and second ends of said first strap member, said first connecting means adapted for connection to said first end of said bit and said second connecting means adapted for connection to one end of said elastic member;

first and second connecting means attached to respective first and second ends of said second strap member, one of said connecting means adapted for connection to said first end of said rein and the other connecting means adapted for connection to the other end of said elastic member; and a second device comprising:

a first strap member having first and second ends;

a second strap member having first and second ends;

an elastic member extending between said strap members;

first and second connecting means attached to respective first and second ends of said first strap member, said first connecting means adapted for connection to said second end of said bit and said second connecting means adapted for connection to one end of said elastic member and;

first and second connecting means attached to respective first and second ends of said second strap member, one of said connecting means adapted for connection to said second end of said rein and the other connecting means adapted for connection to the other end of said elastic member.

2. The training system according to claim 1 wherein said first connecting means of said first strap member of said first and second devices is a snap means and said second connecting means of said strap members is a sewn connection whereby said second end of said first strap member is sewn to one end of said elastic member and said first connecting means of said second strap member is a ring member for attaching said training device to the reins of the strap member is sewn to the other end of said elastic member.

3. An equestrian rider training system comprising a pair of devices connected to the first and second ends of the reins of a bridle said, bridle including a bit for insertion in the mouth of the mount to be ridden, said bit having first and second ends extending from each side of the mount's mouth said system comprising:

a first device comprising:

a strap member of inelastic material having first and second ends;

first connecting means for attaching said first end of said strap member to the first end of said bit;

second connecting means for attaching said second end of said strap member to the first end of said rein;

an elastic member having first and second ends, the first end of said elastic member attached to the first end of said strap member and the second end of said elastic member attached to the second end of said strap member, said elastic member having a length less than the length of said strap member when said elastic member is in an unextended state; and a second device comprising:

a strap member of inelastic material having first and second ends;

first connecting means for attaching said first end of said strap member to said second end of said bit;

second connecting means for attaching said second end of said strap member to the second end of said reins;

an elastic member having first and second ends, the first end of said elastic member being attached to the first end of the strap member and a second end of the elastic member being attached to the second end of the strap member, said elastic member having a length less than the length of said strap member when said elastic member is in an unextended state.

4. The training system according to claim 3 wherein said elastic member of said first and second devices is attached to the first and second ends of said strap member by sewing the respective ends of the strap member and the elastic member together.

5. The training system according to claim 4 wherein the second connecting means is a ring member attached to a loop in said second end of said strap member.

6. The training system according to claim 4 wherein the first connecting means of said first and second devices is an openable loop formed on said first end of said strap member and having means for closing said loop for connecting said strap to said bit.

7. The training system according to claim 6 wherein said means for closing said loop is a buckle means.

* * * * *